United States Patent [19]

Tolstoguzov et al.

[11] 3,829,587

[45] Aug. 13, 1974

[54] METHOD OF MAKING PROTEIN-CONTAINING FOODSTUFFS RESEMBLING MINCED-MEAT

[76] Inventors: Vladimir Borisovich Tolstoguzov, Prospekt Vernadskogo, 24, Kv. 95; Dmitry Borisovich Izjumov, Volokolamskoe shosse, 13, Kv. 56; Valery Yakovlevich Grinberg, Leninsky Prospekt, 94a, Kv. 174; Alla Nikolaevna Marusova, Ulista Lobachevskogo, 78, Kv. 154; Violetta Teofilovna Chekhovskaya, Ulista Bolshaya Ordynka, 17, Kv. 10, all of Moscow, U.S.S.R.

[22] Filed: Apr. 21, 1971

[21] Appl. No.: 136,245

[30] Foreign Application Priority Data
Apr. 24, 1970   U.S.S.R............................. 1427319

[52] U.S. Cl.................................. 426/350, 426/802
[51] Int. Cl............................ A23j 3/00, A23l 1/34
[58] Field of Search................ 99/14, 17; 260/112 R

[56] References Cited
UNITED STATES PATENTS
3,674,500   7/1972   Nagasawa et al........................ 99/17

Primary Examiner—A. Louis Monacell
Assistant Examiner—James Robert Hoffman
Attorney, Agent, or Firm—Holman & Stern

[57] ABSTRACT

Protein containing foodstuffs resembling minced meat are produced by preparing of a mixture containing protein-containing raw food substances, flavouring aromatizing and dyeing agents, spices, salts, water and edible acids taken in amounts that ensure the value of pH of said mixture to be below the isoelectric point of the protein-containing food raw stock being introduced, and charged polysaccharides, followed by stirring the resulting mixture to form a protein-polysaccharide complex and introducing into said mixture while stirring, compounds of metals having a valence of at least two and substances that cause the value of pH of the mixture to exceed the isoelectric point of the protein-containing food raw stock, with subsequent heating of the mixture to destroy said protein-polysaccharide complex.

5 Claims, No Drawings

METHOD OF MAKING PROTEIN-CONTAINING FOODSTUFFS RESEMBLING MINCED-MEAT

The present invention relates to methods of producing protein-containing foodstuffs resembling minced-meat products.

Known heretofore is a method of producing protein-containing meat substitutes which resemble minced-meat products (cf.Patent of GFR No. 1,069,458 of Mar. 6, 1958).

According to said known method casein is mixed with flavouring, aromatizing and dyeing substances, spices, salts and water.

The thus-obtained mixture is heated which results in swelling of casein at the pH value of the mixture ranging from 4.9 to 5.3 and formation of casein gel which resembles minced-meat products.

However, protein-containing foodstuffs resembling minced-meat products feature a low heat-resistance so that obtained by the above prior art method they cannot be subjected to cooking (i.e., boiling or frying).

Said method uses only casein as a protein-containing raw stock, thus omitting the use of any other proteinaceous food raw stock. This is elucidated by the fact that at pH values from 4.9 to 5.3 required for a stable casein gel to form, the formation of stable gels capable of resembling minced-meat products, from any other proteinaceous food raw stock is quite unlikely to occur.

In addition, the formation of a stable casein gel takes place within a narrow range of pH values which necessitates a strict regulation and checking of the pH value of the mixture.

Any attempt to employ pH values beyond the above-specified limits excludes the formation of a stable homogeneous casein gel.

It is therefore an object of the present invention to provide a method that will ensure the production of protein-containing foodstuffs resembling minced-meat products and capable of with-standing further cooking procedures (i.e., frying or boiling).

It is another object of the present invention to provide a method that will enable the production of protein-containing foodstuffs resembling minced-meat products, on the base of proteinaceous food raw materials of animal, vegetable or microbiological origin.

It is another object of the present invention to provide a method that will ensure the production of protein-containing foodstuffs based on gels likely to form within a wide range of pH values.

Disclosed in the present invention is a method of producing protein-containing foodstuffs resembling minced-meat products, said method including the preparation of a mixture of protein-containing food raw stock with flavouring, aromatizing and dyeing agents, spices, salts, and water, as well as heating of the resulting mixture. According to the invention, introduced into said mixture additionally are edible acids taken in amounts making the pH value of the mixture below the isoelectric point of the proteinaceous food raw stock being introduced, and charged polysaccharides, whereupon the resultant mixture is stirred to form a protein-polysaccharide complex therein; further, the mixture is doped, under constant stirring, with compounds of metals having a valence of at least two and with some substances that make the pH value of the mixture above the isoelectric point of the proteinaceous food raw stock, whereupon the mixture is exposed to heating until said protein-polysaccharide complex decomposes.

It is preferred that in the capacity of charged polysaccharides use be made of alginates, pectates and low-ester pectins which are introduced into the mixture at a ratio of 1:1.1 to 1:30 with respect to the proteinaceous food stock, respectively.

As edible acids there may be employed hydrochloric, acetic or citric acid taken in combination or separately.

As agents capable of increasing the pH value of the mixture above the isoelectric point of the proteinaceous food stock, preferably employed are substances selected from the group of hydroxides of alkali- or alkali-earth metals and salts formed by said hydroxides and weak acids.

It is likewise favourable to utilize, as the compounds of metals having a valence of at least two, calcium and aluminum hydroxides and salts taken either separately or in combination.

The method proposed herein enables the production of protein-containing foodstuffs resembling minced-meat products and capable of withstanding a prolonged cooking, i.e., frying or boiling.

As an original proteinaceous food stock for producing said meat-substitution products, use can practically be made of any proteinaceous raw stock of animal, vegetable or microbiological origin.

Also, the use of charged polysaccharides as gelling or pectizing agents is instrumental in producing stable, thermotolerant gels within a wide range of pH values, thus dispensing with the necessity to strictly regulate and observe the pH value of the mixture.

The method disclosed herein includes the following:

A mixture is prepared composed of original proteinaceous food stock, charged polysaccharides, water and solutions of edible acids, the latter being taken in amounts that establish the pH value of the mixture to be below the isoelectric point of the original proteinaceous food stock involved. The mixture thus obtained is subjected to stirring.

At the pH values of the mixture below the isoelectric point of the original proteinaceous food stock employed, primarily from 3.5 to 5.0, an interaction occurs between negatively-charged polysaccharides and positively-charged (within the above-stated range of pH values) proteins incorporated into the original proteinaceous food stock, resulting in the formation of a protein-polysaccharide complex.

A charged polysaccharide interacts with amino-groups of protein through the intermediary of carboxy groups whence polysaccharides incorporated into the protein-polysaccharide complex have their carboxy groups become unreactive.

To ensure that the carboxy groups of polysaccharides become completely unreactive and the entire amount of polysaccharide be incorporated into the protein-polysaccharide complex, it is recommended that an excess of protein be employed, or a protein-polysaccharide ratio equal to from 1.1:1 to 30:1, respectively.

As an original proteinaceous food stock there may be employed finely comminuted powders of proteins or protein-containing products of vegetable, animal or microbiological origin, such as casein, dried milk, soybean or yeast protein.

As charged polysaccharides capable of forming thermo-stable gels in the presence of ions of metals having a valence of at least two, there may be employed alginates, pectates and low-ester pectins.

As edible acids capable of shifting the pH value of the mixture below the isoelectric point of the original proteinaceous food stock employed, there may be employed hydrochloric, acetic or citric acid taken in combination or separately.

Once a protein-polysaccharide complex has been formed in the above mixture, there are introduced the compounds of metals having a valence of at least two and substances capable of increasing the pH value of the mixture above the isoelectric point of the original proteinaceous food stock, primarily from 6.0 to 9.0, whereupon the mixture is thoroughly stirred to adequately spread the compounds of metals having a valence of at least two therein.

Under said conditions no interaction between the carboxy groups of polysaccharide incorporated into the protein-polysaccharide complex and ions of metals occurs. Then the mixture is heated to 40°–90°C for a period of from 20 minutes to 2 hours.

Heating of the mixture at the pH values thereof above the isoelectric point of the utilized original proteinaceous food stock in the presence of the compounds of metals having a valence of at least two results in the decomposition of the protein-polysaccharide complex, as well as interaction of polysaccharide with ions of metals having a valence of at least two and formation of a thermo-stable polysaccharide gel with the original proteinaceous food stock contained therein.

As substances capable of shifting the pH value of the mixture above the isoelectric point of the original protein-aceous food stock, there may be employed hydroxides of alkali- or alkali-earth metals, as well as of salts formed by said hydroxides with weak acids, e.g., calcium, sodium or aluminium hydroxides, sodium carbonate and bicarbonate.

As the compounds of metals having a valence of at least two use is made of hydroxides or salts of calcium or aluminium taken either in combination or separately, e.g., calcium or aluminium hydroxide, calcium chloride or acetate, aluminium chloride taken in combination or separately.

The use of calcium or aluminium hydroxides provides for a simultaneous increase in the pH of the mixture and the presence of free ions of metals having a valence of at least two therein which are indispensable for the formation of thermostable polysaccharide gels.

The thus-obtained polysaccharide gels filled with the original proteinaceous food stock, resemble minced-meat products and are capable of being cooked under frying and boiling conditions.

To better resemble the minced-meat products introduced into the finished meat-substitution products are flavouring, aromatizing and dyeing agents, spices and salts. Said additives may be introduced either at the stage of the mixture preparation when its pH value is below the isoelectric point of the original protein-aceous food stock or along with the compounds of metals having a valence of at least two prior to heating the mixture.

As aromatizing and flavouring additives use may be made, say, of vitamins, mineral salts, mixtures of amino acids, amino-acid hydrolysate of various origin, including those of vegetable proteins or yeast, common salt, sodium glutamate, inosinates, and the products of Maillard's reaction. In the capacity of aromatizing and flavouring agents use may also be made of animal-origin extracts, as well as condiments and spices, garlic powder and pepper.

As dyeing agents there may be employed any suitable food colours, such as beet-tea caramel colours, cacao powder or food serum albumin.

To increase the caloricity of the product obtained, there may be introduced thereinto any edible fats of vegetable or animal origin.

In the case of obtaining a product resembling sausage items the mixture containing the protein-polysaccharide complex formed therein, is placed in cellophane shells, and the latter are tied up and subjected to heating at 60°–100°C for 20–90 minutes, whereupon the product is smoke-cured.

The thus-obtained sausage items may be stored in chilled state and then heated in hot or boiling water or fried before eating.

To prepare meat substitutes resembling other minced-meat products, e.g., chops, cutlets, schnitzels, the mixture is heated and fried by conventional method whether having been preliminarily baked in suitable pans or moulds, or not.

Meat-substitution products obtained by the method of the invention are stored in chilled frozen or hermetically sealed and sterilized state.

Provided below are examples illustrating the production of protein-containing foodstuffs resembling minced-meat products, by the method proposed herein.

EXAMPLE 1

50 g of a 10-percent solution of edible gelatin and 100 g of a 2.5-percent solution of sodium alginate are stirred at 50°C until a homogeneous mixture is obtained. Added to the resultant mixture at the same temperature and under constant stirring is acetic acid until the pH value is equal to 4.5. The obtained mixture wherein a protein-polysaccharide complex has been formed under the above conditions, is cooled and stored in a refrigerator.

To prepare a protein-containing foodstuff resembling sausage, to 30 g of the resultant mixture containing said protein-polysaccharide complex, are added while stirring 30 g of finely disintegrated casein, 30 g of water, 2 g of common salt, 1.5 g of calcium hydroxide powder, 2 g of fluid beef extract, 3 g of margarine, 0.3 g of food albumin, 0.1 g of cacao powder and 0.1 g of beet-tea caramel colour.

Then the mixture is homogenized for 10–30 minutes.

Further, the mixture is packed into a cellophane shell which is then tied up and the mixture contained therein is steam-cooked for 20 minutes.

Upon completion of cooking, the protein-containing foodstuff resembling sausage is subjected to surface-treatment by smoke-curing liquor.

The finished product is light-rose coloured and possesses the odour, palatability and texture resembling those of natural sausage.

The finished product can be reheated by immersing in hot water or pan-frying.

EXAMPLE 2

50 g of a 10-percent solution of edible gelatin and 50 g of a 4-percent solution of low-ester pectin at an ester value of 40 percent are stirred at 60°C until a homogeneous mixture occurs.

To the thus-obtained mixture hydrochloric acid is added till the pH value of the mixture is equal to 4.0.

40 g of the mixture incorporating the thus-resulting gelatin-pectin complex, is mixed with 25 g soybean protein, 30 g of water, 2 g of margarine, 2 g of common salt, 1.5 g of calcium acetate, 1 g of the products of Maillard's reaction, 0.3 g of sodium glutamate, 0.5 of food albumin, 0.1 g of beet-tea caramel colour and 10 ml of a 10-percent solution of sodium hydroxide.

The mixture is then homogenized for 10–30 minutes, whereupon it is packed into a cellophane shell and steam-cooked for 30 minutes.

The finished product resembles sausage items and is similar to the product obtained as described in Example 1.

EXAMPLE 3

30 g of soybean protein, 30 g of water, 3 g of margarine, 1.5 g of common salt, 2 g of fluid beef extract, 0.1 g of powdered pepper, 0.3 g of food albumin, 0.1 g of beet-tea caramel colour are mixed with 50 g of a 3-percent solution of sodium pectate and 2 g of crystalline citric acid. The mixture is homogenized by thoroughly stirring for 30 minutes. Then into the mixture are added 1 g of powdered calcium chloride and 2.2 g of sodium bicarbonate, whereupon the mixture is stirred during 10 minutes. The homogenated mixture is placed in a cellophane shell and steam-cooked for 20 minutes.

The finished product is similar to that obtained by the technique described in Example 1.

EXAMPLE 4

30 g of dried milk, 2 g of yeast protein, 30 g of water, 1.5 g of common salt, 2 g of fluid beef extract, 0.1 g of powdered pepper, 0.3 g of food albumin, 0.1 g of beet-tea caramel colour, and 2 g of margarine are mixed with 30 g of a 3-percent solution of sodium alginate, 20 g of a 4-percent solution of low-ester pectin, 0.5 g of citric acid and 3 ml of a 10-percent acetic acid. Said ingredients are stirred for 30 minutes, and then into the resultant mixture are added 0.5 g of aluminium hydroxide and 1.2 g of calcium acetate. The mixture is stirred again and packed into cellophane shells. Further treatment is carried out as described in Example 1. The finished product is similar to that obtained by the technique of Example 1.

EXAMPLE 5

To obtain a product resembling cooked sausage the technique of Example 1 is employed with the sole exception that at the stage of introducing food substances into the mixture 10 g of fine-cut bacon are used instead of 3 g of margarine.

EXAMPLE 6

A mixture prepared similar to that described in Example 5 is placed in a pane or mould for baking sausage loaves and maintained at 90°C for 30–40 minutes. The product obtained resembles sausage loaf.

EXAMPLE 7

To 100 g of a mixture prepared as described in Example 1 is added 60 g of crumb and the mixture is stirred.

The mixture obtained is pan-fried. The finished product resembles chopped schnitzel or cutlets.

What we claim is:

1. A method of producing protein-containing foodstuffs resembling minced-meat products, comprising: preparing a mixture including protein-containing food raw stock, flavouring, aromatizing and dyeing agents, spices, salts, water and edible acids in amounts that ensure the value of pH of said mixture to be below the isoelectric point of the protein-containing food raw stock being introduced, and charged polysaccharides selected from the group consisting of alginates and pectates; stirring said resulting mixture until there is formed a protein-polysaccharide complex; introducing into said resulting mixture under constant stirring, an edible compound of a metal having a valence of at least two and substances that cause the pH value of the mixture to exceed the isoelectric point of the protein-containing food raw stock, followed by heating said mixture to destroy said protein-polysaccharide complex and to form a polysaccharide gel foodstuff product.

2. A method as claimed in claim 1, wherein the charged polysaccharides are introduced into the mixture at a ratio of 1:1.1 to 1:30 with respect to the proteinaceous food stock.

3. A method as claimed in claim 2, wherein the edible acids are selected from the group consisting of hydrochloric, acetic and citric acid taken in combination or separately.

4. A method as claimed in claim 3, wherein the substance capable of increasing the pH value of the mixture above the isoelectric point of the proteinaceous food stock is selected from the group consisting of hydroxides of alkali- or alkali-earth metals and salts of weak acids with alkali- or alkali-earth metals.

5. A method as claimed in claim 4, wherein the compound of the metal having a valence of at least two is selected from the group consisting of hydroxides and salts of calcium and aluminium taken in combination or separately.

* * * * *